Dec. 31, 1963
L. J. KROKO
3,116,442
SILICON RECTIFIER ASSEMBLY COMPRISING
A HEAT CONDUCTIVE MOUNTING BASE
Filed July 27, 1959
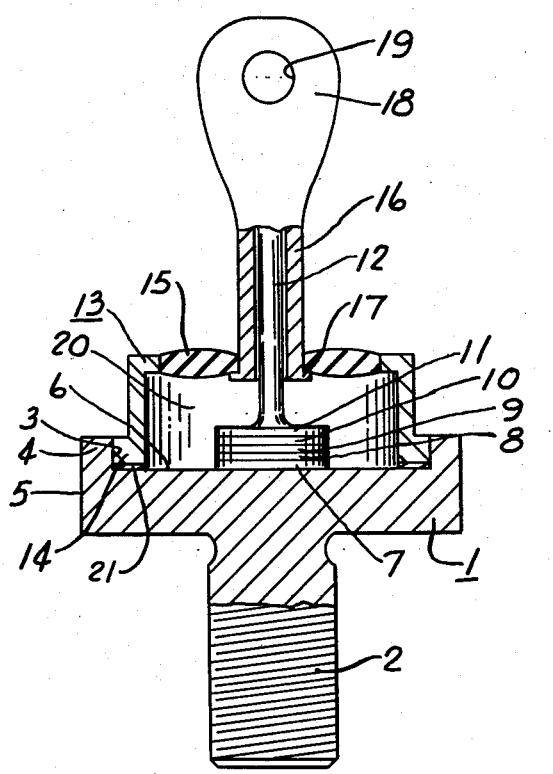
INVENTOR.
LEONARD J. KROKO
BY
HIS ATTORNEY 3,116,442
SILICON RECTIFIER ASSEMBLY COMPRISING A
HEAT CONDUCTIVE MOUNTING BASE
Leonard J. Kroko, Pitcairn, Pa., assignor, by mesne
assignments, to Link-Belt Company, Chicago, Ill., a
corporation of Illinois
Filed July 27, 1959, Ser. No. 829,802
2 Claims. (Cl. 317—234)

This invention relates generally to silicon rectifiers and more particularly to the construction of the rectifier.

The principal object of this invention is the provision of a silicon rectifier base made of iron which is adequate to conduct heat from the rectifier and at the same time provide a very strong mounting member.

Heretofore rectifier bases for silicon and germanium rectifiers have been made of copper. Copper provides a much lower electrical and thermal resistance than iron but is very difficult to machine and since the base is ordinarily provided with a threaded member for the purpose of connecting it into a circuit the copper threads are a source of trouble owing to the fact that they are not sufficiently strong to withstand the pressure applied in attaching a conductor to the base by means of a nut and wrench.

In addition copper is difficult to machine and readily dulls the tools employed in forming the base. The employment of iron or steel in place of copper eliminates many of the foregoing problems.

The cap that covers the rectifier and contains the ceramic insulation is of necessity preferably made of a ferrous metal product and in order to attach this cap to the copper base by welding it is first necessary to employ a steel washer which is either brazed or welded or otherwise secured to the copper base. The rectifier is then assembled on the copper base in contact with the washer applied thereto and when the ferrous metal cap is applied it may be welded to the ferrous metal washer.

These steps are avoided by providing a ferrous metal base thereby eliminating the use of the brazing washer together with the steel washer as a ferrous metal base will directly receive a ferrous metal cap in a single welding step which is much simpler and easier and materially less expensive in the process of making this improved rectifier.

In constructing a silicon rectifier, a molybdenum disc is brazed, soldered or otherwise secured to the ferrous metal base, the latter of which has been treated by nickelplating. The silicon disc is then fused to the molybdenum. Thereafter a current collecting surface on the silicon has fused thereto the head of a tantalum nail. The cap with its ceramic insulator is provided with an eyelet having a long shank to receive the tantalum nail which is sealed by crushing and flattening the tantalum nail with the stem of the eyelet and perforating the same to form an electrode which is employed for securing the rectifier in the circuit.

The present invention deals with the foregoing improvement in constructing and assembling the silicon rectifier.

Other objects and advantages appear hereinafter in the following description and claims.

The accompanying drawing shows for the purpose of exemplification without limiting this invention or the claims thereto, certain practical embodiments illustrating the principles of this invention which illustrates an enlarged silicon rectifier partly in section.

Referring to the drawing the base 1 is made of steel or other suitable ferrous alloys which has been surface coated with nickel. The steel base has a threaded terminal 2 on one end thereof and the other end is provided with a cup 3 defined by the annular rim 4.

The peripheral surface 5 of the base 1 is preferably shaped hexagonally so that a wrench or other fastening means may be applied thereto for the purpose of tightening a nut on the threaded section 2 to secure a terminal thereto. The inner face 6 of the cup has some form of metal applied thereto such as soldering or brazing compound indicated at 7 for the purpose of securing the molybdenum disc 8 to the base. The molybdenum disc 8 has fused thereto the silicon disc 9 which is a semiconductor provided with an impurity to make it either a P semiconductor or an N semiconductor. The top surface of the silicon disc 9 is provided with a counter electrode 10 that is welded, soldered, brazed or otherwise fused to the head 11 of the tantalum nail 12.

The cap member 13 which is provided with the foot 14 engaging within the annular rim 4 is a cylindrical ferrous metal body, the inner and outer surfaces of which are likewise coated with nickel. The closed end of this cap or closure 13 has a ceramic insulator formed therein. The center of the insulator 15 has secured thereto the eyelet 16 having a head 17 and a long tubular body that extends loosely around the stem of the nail 12.

The rectifier is assembled by placing the tantalum nail on a seat in a carbon boat then adding a thin disc of aluminum silicon alloy which forms the counter electrode and provides the real junction of the rectifier. On this aluminum silicon alloy disc is placed the silicon crystal in the form of a disc and on the silicon crystal is placed a silver lead antimony alloy disc of the N type which is approximately two-thousandths of an inch thick and which functions as a mere soldering joint with only contact between the silicon crystal and the molybdenum disc which is the last to be placed in the stack. A mechanical pressure is exerted on the stack elements in the carbon boat and the boat is then placed in a furnace having a vacuum of approximately five times ten to the minus five millimeters of mercury and quickly raised to a peak temperature of 900° C. for approximately five seconds at which time the fusion between each of these elements has taken place.

This rectifier assembly is then placed with the molybdenum disc on a thin disc of pure tin solder that rests on the nickel-plated surface of the iron base which is heated to solder the assembly in place.

The cap 13 with its cylindrical foot is then welded on the base 1 as indicated at 21 and the assembly is then placed in an oven with its chamber formed by the cap 13 being open through the eyelet 16 to drive out any moisture and to insure that the chamber 20 contains only the rectifier and dry heated air. While the rectifier is within this drying chamber, the eyelet 16 on the stem of the nail 12 is crushed or flattened to form the terminal. After the rectifier is removed from the drying furnace the crushed end is dipped in tin to insure a good seal. The flattened terminal member 18 is punched with the opening 19.

After this assembly operation the rectifiers are then aged and then classified in accordance with their characteristics and are ready for use.

The use of the nickel-plated steel base 1 and the nickel-plated steel cap member 13 with its nickel-plated eyelet 16 will of course increase the resistance to the flow of current to the rectifier. However, this resistance to the flow of current is far less than that created by the solder or other fastening media between the molybdenum disc 8 and the steel base 1. Thus since the base and the eyelet have less resistance than the connecting media, the total resistance of the assembly is not much greater in employing the nickel-plated iron than with the use of copper as the base member. On the other hand, the iron base member provides a much stronger and better assembly member than that of the copper which is considerably more advantageous in the production of the rectifier.

The total resistance of the rectifier assembly employing the nickel-coated steel terminals in the base and the eyelet is very little greater than that employing a copper electrode owing to the high resistance of the solder or brazing connections within the assembly. The iron base is a satisfactory thermal diffusing medium (there is no time effect). Thus the silicon rectifier is handsomely improved by using the ferrous metal base.

I claim:

1. A silicon diode consisting of a tantalum electrode, an aluminum silicon alloy interposed between a silicon crystal and said tantalum electrode to fuse the latter thereto, said silicon crystal being supplied with an impurity to endow it with a selected polarity type, a molybdenum disc fused to the opposite side of the silicon crystal, a cap member having an extended eyelet surrounding said electrode and supported by an annular insulator on a ferrous metal cup member, said electrode and said eyelet being sealed together to form a terminal and a base of ferrous metal soldered to the other side of the molybdenum disc and welded to said cup member.

2. A silicon diode consisting of a nickel-plated ferrous metal base, a molybdenum disc soldered to the center of the base, a silver lead antimony disc on top of the molybdenum disc, a silicon crystal on top of the silver antimony disc, an aluminum silicon alloy disc on top of the crystal and a tantalum disc on top of the aluminum silicon alloy, each of said discs being fused to each other and to the base to form a rectifier, an electrode extending from the tantalum disc, a tubular eyelet surrounding said electrode, an annular insulator sealed with said eyelet encompassing the same, a nickel-plated ferrous metal cap member sealed with the perimeter of the insulator and a continuous sealing weld between said cap and said base member to form a chamber.

References Cited in the file of this patent
UNITED STATES PATENTS

| | | |
|---|---|---|
| 2,790,940 | Prince | Apr. 30, 1957 |
| 2,805,370 | Wilson | Sept. 3, 1957 |
| 2,811,682 | Pearson | Oct. 29, 1957 |
| 2,813,326 | Liebowitz | Nov. 19, 1957 |
| 2,836,878 | Shepard | June 3, 1958 |
| 2,866,928 | Blundell | Dec. 30, 1958 |
| 2,964,830 | Henkels et al. | Dec. 20, 1960 |